US006802128B1

(12) United States Patent
Yang et al.

(10) Patent No.: US 6,802,128 B1
(45) Date of Patent: Oct. 12, 2004

(54) ENGRAVING DIAL FOR INSIDE RING ENGRAVING MACHINE

(76) Inventors: His-Shan Yang, No. 103, Jiing Long Street, Taipei (TW); Bonnie Hau Yung Lang, 2476 S. Coravlew Ln., Rowland Hts., CA (US) 91748

( * ) Notice: Subject to any disclaimer, the term of this patent is extended or adjusted under 35 U.S.C. 154(b) by 0 days.

(21) Appl. No.: 10/655,947

(22) Filed: Sep. 4, 2003

(51) Int. Cl.[7] ............................ B23C 1/16; B43L 13/10

(52) U.S. Cl. .......................... 33/18.1; 409/130; D18/57

(58) Field of Search ............................... 33/18.1, 1 CF; D18/57; 409/79, 130, 125

(56) References Cited

U.S. PATENT DOCUMENTS 2,883,918 A * 4/1959 Mosteller .................... 33/18.1
3,295,211 A * 1/1967 Nisenson ..................... D18/57
3,608,429 A * 9/1971 Berlant ......................... 409/86
3,736,841 A * 6/1973 Usami ......................... 409/130
3,755,904 A * 9/1973 Kestler ....................... 33/18.1

* cited by examiner

*Primary Examiner*—Christopher W. Fulton
(74) *Attorney, Agent, or Firm*—Pro-Techtor Inter-National Services

(57) ABSTRACT

An engraving dial formed of an upper dial plate, a lower dial plate, a bottom holder plate and a top holder plate for use in an inside ring engraving machine form is disclosed in which the upper dial plate and the lower dial plate are detachably and reversibly secured between the top and bottom holder plates, each dial plate having the top and bottom sides respectively engraved with a set of signs of a different form for selection.

3 Claims, 8 Drawing Sheets

ENGRAVING DIAL FOR INSIDE RING ENGRAVING MACHINE

BACKGROUND OF THE INVENTION

1. Field of the Invention

The present invention relates to an engraving dial formed of an upper dial plate and a lower dial plate for use in an inside ring engraving machine and, more particularly to such an engraving dial, which has the top and bottom sides of each dial plate respectively engraved with a respective set of signs for engraving selection.

2. Description of the Related Art

A ring is a circular band of precious metal, worn as an ornament. For memorial purpose, people may have the inside ring engraved with letters, numbers, symbols, etc., (hereinafter called signs).

A machine for engraving signs on the inside ring of a ring is called "inside ring engraving machine". An inside ring engraving machine is used with an engraving dial to achieve the engraving. The invention pertains to an engraving dial for inside ring engraving machine.

FIGS. 1 and 2 show an engraving dial constructed according to the prior art. According to this design, the engraving dial, referenced by 70, comprises a lower dial plate 71, a hub 72 locked to the lower dial plate 71 at the top, and an upper dial plate 73 rotatably mounted on the hub 72 and supported on the top side of the lower dial plate 71. The dial plates 71 and 73 have engraved signs 74 or 75 at the top. The lower dial plate 71 has V-notches 76 equiangularly spaced around the periphery.

When engraving words, for example, "My" on the inside ring and assuming that the initial "M" is at the lower dial plate 71 and the last letter "y" is at the upper dial plate 73, thus the engraving operation is as follows:

At first, as shown in FIG. 3, the engraving dial 70 is installed in the base 61 of the inside ring engraving machine 6, and then the engraving dial 70 is rotated to let the stopper 62 engage the V-notch 76 corresponding to the sign "M", holding the lower dial plate 73 in the engraving position. Thereafter, fasten up the tightening knob 63 to lock the engraving dial 70 to the base 61 of the inside ring engraving machine 6. Thus the user can operate the inside ring engraving machine to move the tracing stylus shaft 64 on the letter "M", causing the diamond engraving cutter (not shown) to engrave the inside ring of the loaded ring.

When engraving the letter "y", as shown in FIG. 4, rotate the upper dial plate 73, for enabling the steel balls 79 of the locators 78 to be respectively forced by the respective compression springs 80 into the recessed round holes 81 at the lower dial plate 71 (See FIG. 2). Upon engagement of the steel balls 79 into the recessed round holes 81 of the lower dial plate 71, a positioning click sound is produced, and the upper dial plate 73 is locked to the lower dial plate 71. At this time, the signs 75 at the upper dial plate 71 and the signs 74 at the lower dial plate 71 are respectively aligned. Thereafter, fasten up the hold down bolt 82 to lock the upper dial plate 73 to the lower dial plate 71, and then rotate the engraving dial 70 to let the stopper 62 engage the V-notch corresponding to the sign "y" at the upper dial plate 73, and then fasten up the tightening knob 63 to lock the engraving dial 70 to the base 61 of the inside ring engraving machine 6. Thus, the user can then engrave the sign "y" on the inside ring of the loaded ring.

This design of engraving dial provides only one combination of signs, for example, the combination of full cap signs at the lower dial plate and minuscule signs at the upper dial plate. Further, because one dial plate provides only one form of signs, the user may have to prepare additional dial plates of different forms of signs for selection.

SUMMARY OF THE INVENTION

The present invention has been accomplished under the circumstances in view.

It is the main object of the present invention to provide an engraving dial, which has the top and bottom sides of each dial plate respectively engraved with a respective set of signs, providing four combinations for engraving selection.

To achieve this and other objects of the present invention, the engraving dial comprises a bottom holder plate, the bottom holder plate comprising an upper part, a lower part, the lower part of the bottom holder plate having an outer greater than the upper part of the bottom holder plate, a center through hole through the lower part and upper part of the bottom holder plate, and a plurality of screw holes extended through the lower part of the bottom holder plate and equiangularly spaced around the center through hole of the bottom holder plate; a lower dial plate, the lower dial plate comprising a center through hole adapted to accommodate the lower part of the bottom holder plate, a plurality of peripheral notches equiangularly spaced around the periphery thereof, two sets of signs respectively engraved on top and bottom sides thereof at imaginary radial lines between the center through hole of the lower dial plate and the peripheral notches, a plurality of recessed round holes symmetrically formed at the top and bottom sides and equiangularly spaced around the center through hole of the lower dial plate at an imaginary circle concentric to the center through hole of the lower dial plate; an upper dial plate, the upper dial plate comprising a center through hole, a peripheral opening, two sets of signs respectively engraved on top and bottom sides thereof corresponding to the signs at the lower dial plate; a top holder plate, the top holder plate comprising an upper part, a lower part fitted into the center through hole of the upper dial plate, the lower part of the top holder plate having a diameter smaller than the upper part of the top holder plate, a center through hole adapted to accommodate the upper part of the bottom holder plate, and a plurality of countersunk holes respectively fastened to the screw holes of the bottom holder plate by screws; and at least one locator, the at least one locator each comprising a retaining member respectively fastened to and vertically extended through the top holder plate, the retaining member having a bottom mounting hole, a compression spring mounted in the bottom mounting hole of the retaining member, and a steel ball supported on the compression spring at a bottom side and forced by the compression spring to selectively engage the recessed round holes of the lower dial plate.

DETAILED DESCRIPTION OF THE PREFERRED EMBODIMENT

Figure 1:
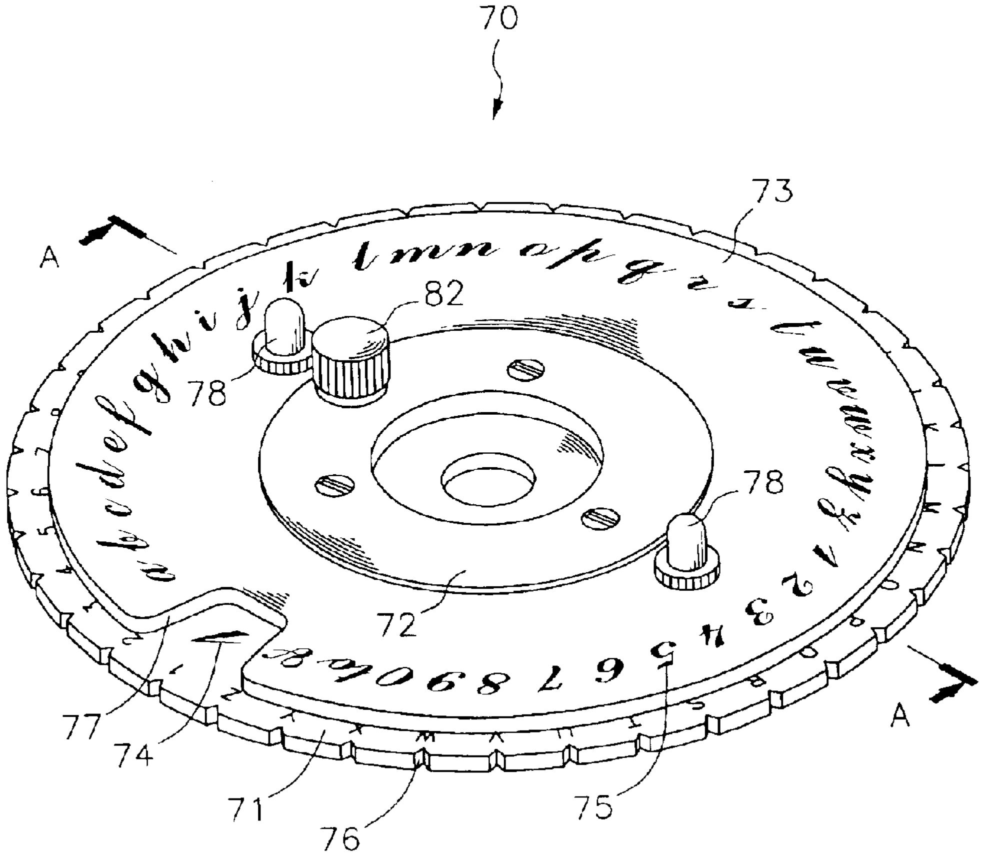
FIG. 1 (Prior Art)
FIG. 1 is an elevational view of an engraving dial for inside ring engraving machine according to the prior art.
Figure 2:
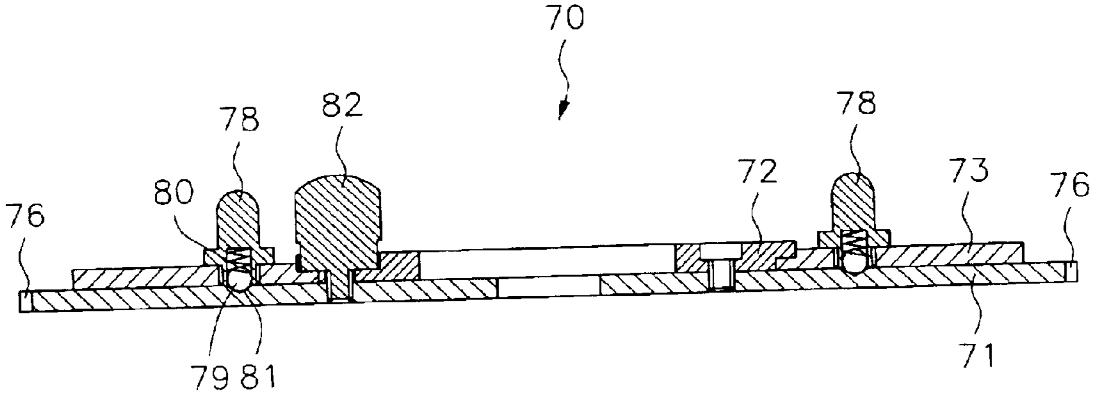
FIG. 2 (Prior Art)
FIG. 2 is a sectional view taken along line A—A of FIG. 1.
Figure 3:
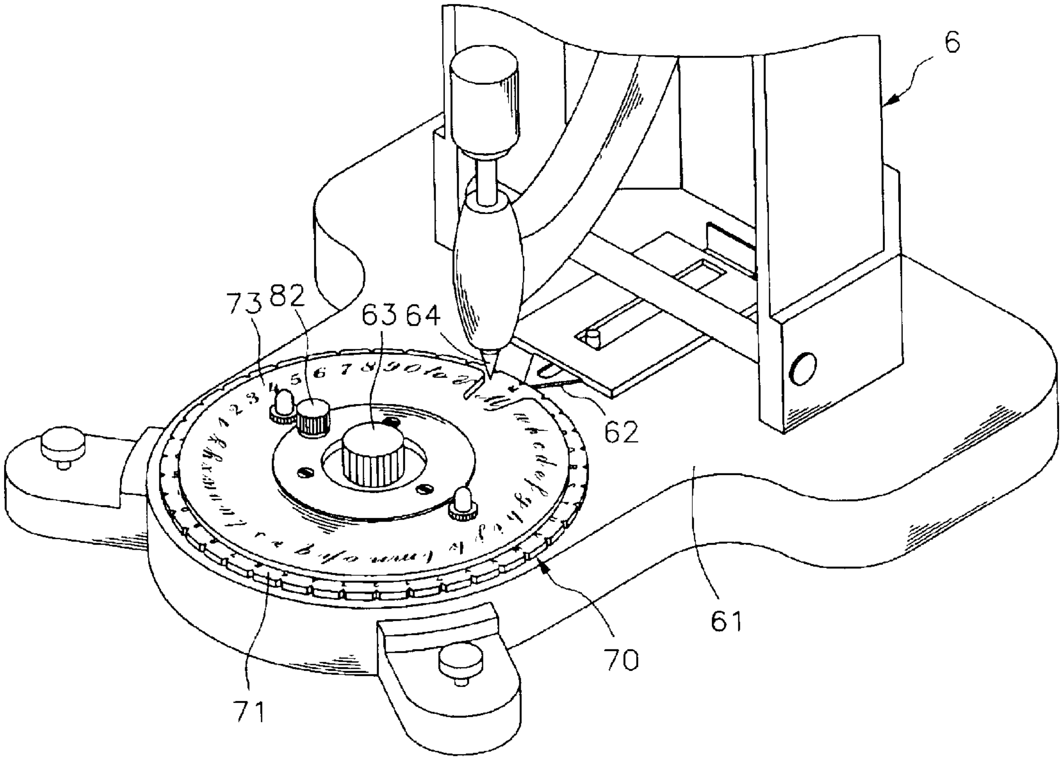
FIG. 3 (Prior Art)
FIG. 3 is an installed view of the prior art engraving dial in an inside ring engraving machine, showing the tracing of the tracing stylus shaft on the sign "M" at the lower dial plate.
Figure 4:
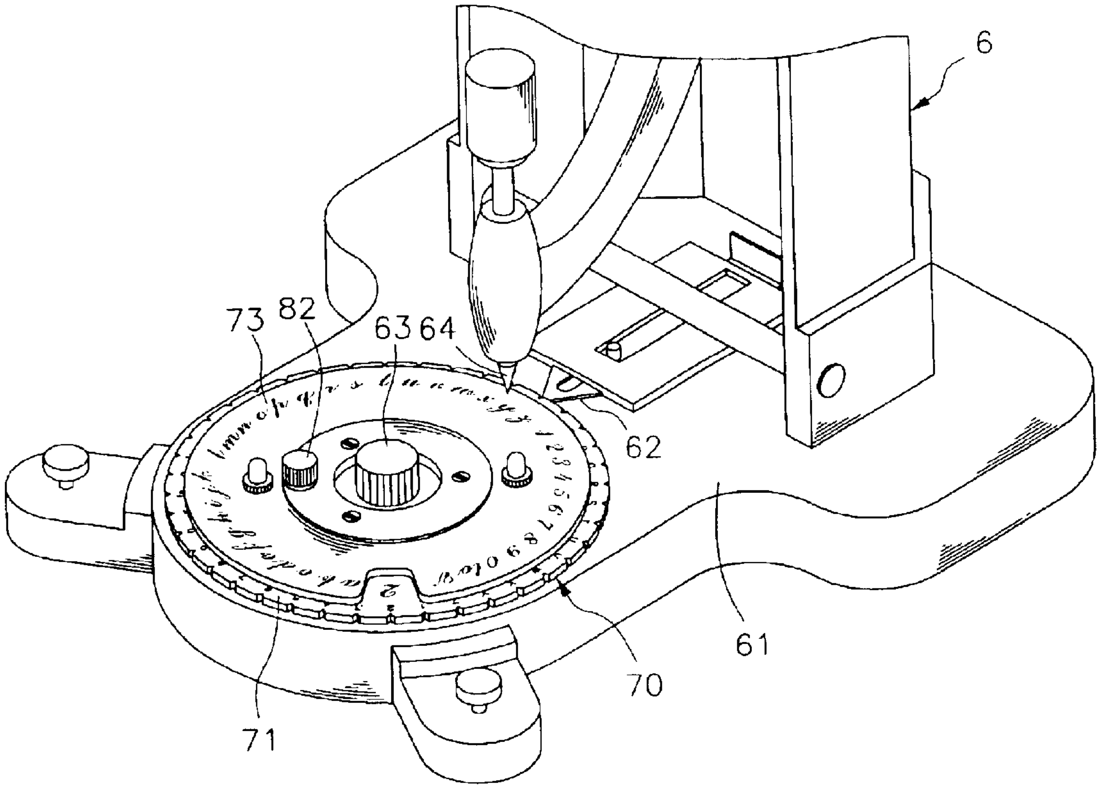
FIG. 4 (Prior Art)
FIG. 4 is similar to FIG. 3 but showing the tracing of the tracing stylus shaft on the sign "y" at the upper dial plate.
Figure 5:
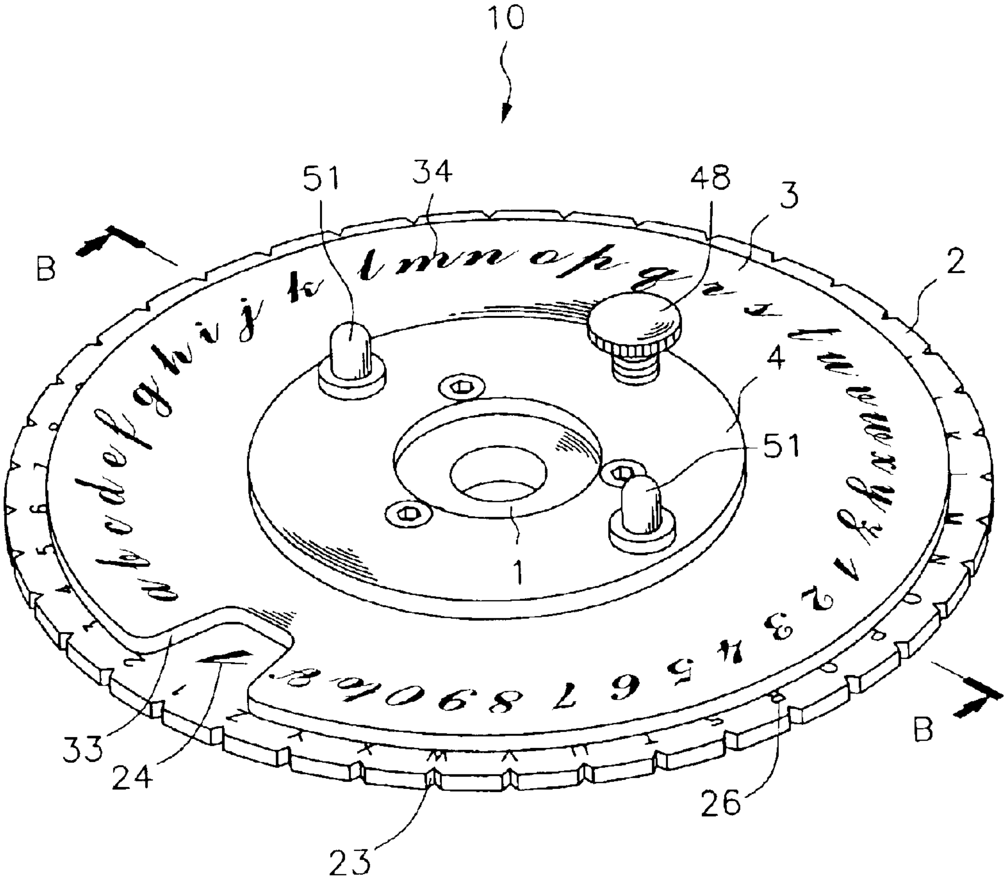
FIG. 5 is an elevational view of an engraving dial for inside ring engraving machine according to the present invention.
Figure 6:
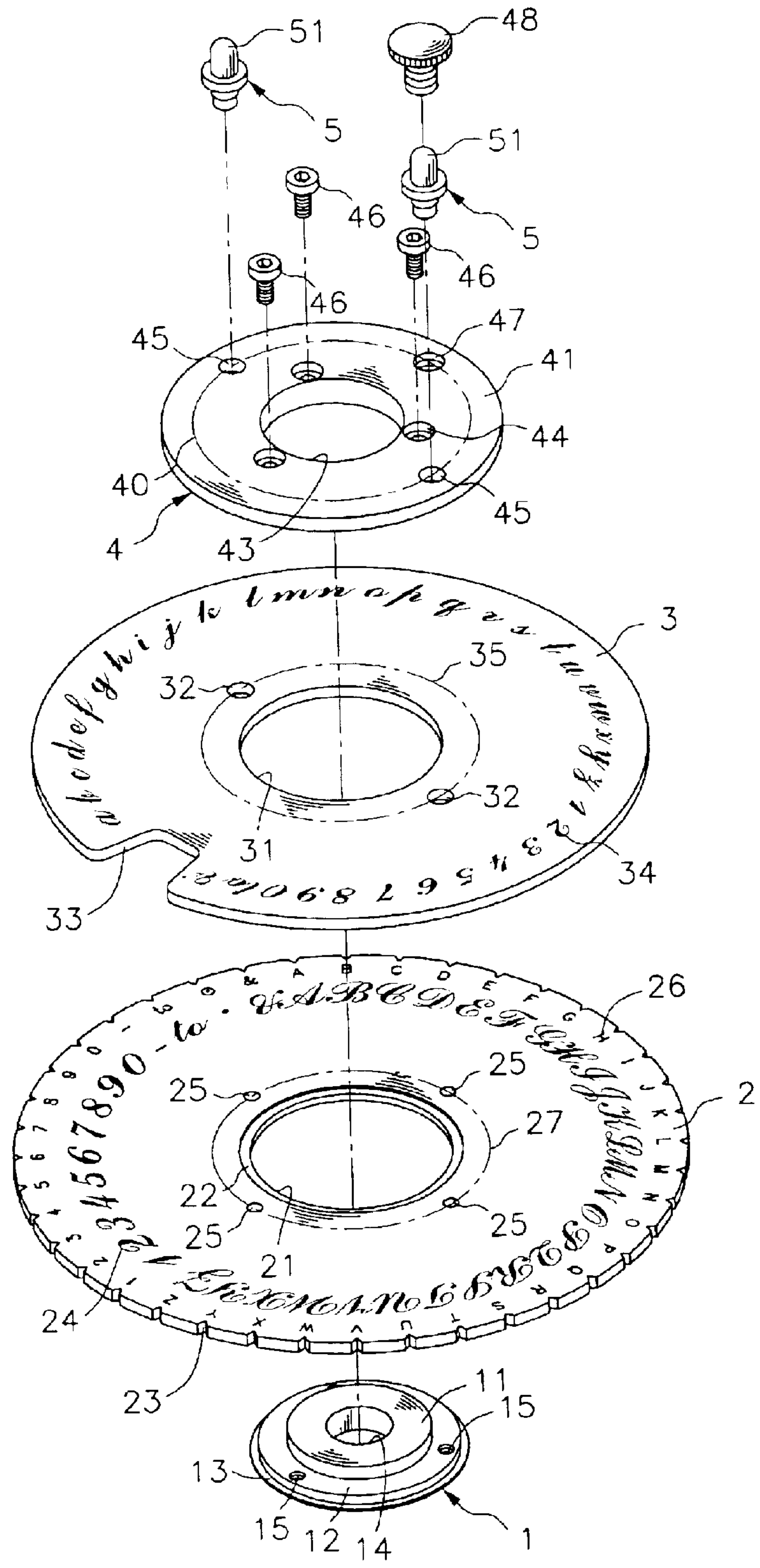
FIG. 6 is an exploded view of the engraving dial according to the present invention.
Figure 7:
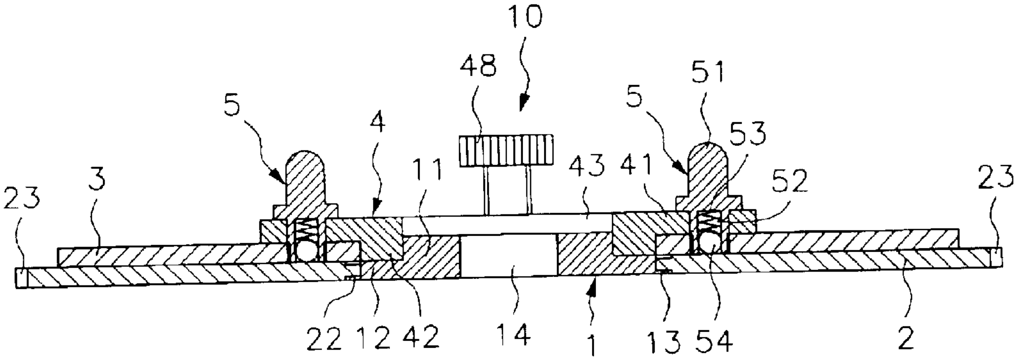
FIG. 7 is a sectional view taken along line B—B of FIG. 6.

Referring to FIGS. 5~7, an engraving dial 10 in accordance with the present invention is shown comprised of a bottom holder plate 1, a lower dial plate 2, an upper dial plate 3, a top holder plate 4, and two-locators 5.

The bottom holder plate 1 comprises an upper part 11 and a lower part 12. The outer diameter of the lower part 12 is greater than the upper part 11. The lower part 12 has a flange 13 radially extended around the periphery thereof. The bottom holder plate 1 further comprises a center through hole 14 through which a dial tightening knob 63 is inserted to fix the engraving dial 10 to the base 61 of the inside ring engraving machine 6 (see FIG. 10), and a plurality of screw holes 15 extended through the lower part 12.

The lower dial plate 2 is circular member stamped from a copper plate, having a center through hole 21 adapted to accommodate the lower part 12 of the bottom holder plate 1, two annular grooves 22 symmetrically formed at the top and bottom sides around the center through hole 21, a plurality of V-notches 23 equiangularly spaced around the periphery and adapted to receive the stopper 62 of the inside ring engraving machine 6 for enabling the lower dial plate 2 to be held in the engraving position, signs 24 symmetrically engraved on the top and bottom sides at the imaginary radial lines between the center through hole 21 and the V-notches 23, a plurality of recessed round holes 25 symmetrically formed at the top and bottom sides and equiangularly spaced around the center through hole 21 at an imaginary circle 27 concentric to the center through hole 21. The annular grooves 22 are adapted to receive the flange 13 of the bottom holder plate 1, keeping the bottom holder plate 1 in flush with the bottom or top side of the lower dial plate 2 (see FIG. 7).

The upper dial plate 3 is a circular member stamped from a copper plate, having a center through hole 31, a plurality of locating holes 32 equiangularly spaced around the center through hole 31 at an imaginary circle 35 concentric to the center through hole 31 and corresponding to the circle 27 at the lower dial plate 2, and signs 34 symmetrically engraved on the top and bottom sides corresponding to the signs 24 at the lower dial plate 2. The signs 34 at the upper dial plate 3 and the signs 24 at the lower dial plate 2 are of different forms and different sizes. The number of the locating holes 32 of the upper dial plate 3 is half of the number of the recessed round holes 25 of the lower dial plate 2.

The upper dial plate 3 has a peripheral opening 33 through which the user can selectively see one or two signs 24 of the lower dial plate 2 while the other signs 24 of the lower dial plate 2 are blocked by the upper dial plate 3. Further, supplementary signs 26 are symmetrically engraved on the top and bottom sides of lower dial plate 2 and respectively disposed adjacent to the V-notches 23. The supplementary signs 26 are respectively indicative of the signs 24. When the engraving dial 10 assembled and installed in the engraving machine 6, the supplementary signs 26 are disposed outside the upper dial plate 3. By means of the indication of the supplementary signs 26, the user can quickly adjust the engraving dial 10 to move the assigned sign 24 to the engraving position.

The top holder plate 4 comprises an upper part 41 and a lower part 42. The outer diameter of the upper part 41 is greater than the lower part 42. The lower part 42 is fitted into the center through hole 31 of the upper dial plate 3, keeping the bottom side of the top holder plate 4 in flush with the bottom side of the upper dial plate 3 (see FIG. 6). The top holder plate 4 has a center through hole 43 adapted to accommodate the upper part 11 of the bottom holder plate 1, a plurality of countersunk holes 44 equiangularly spaced around the center through hole 43 and respectively fastened to the screw holes 15 of the bottom holder plate 1 by screws 46, and a plurality of locating holes 45 located on an imaginary circle 40 concentric to the center through hole 43 and corresponding to the imaginary circle 27 at the lower dial plate 2.

Figure 8:
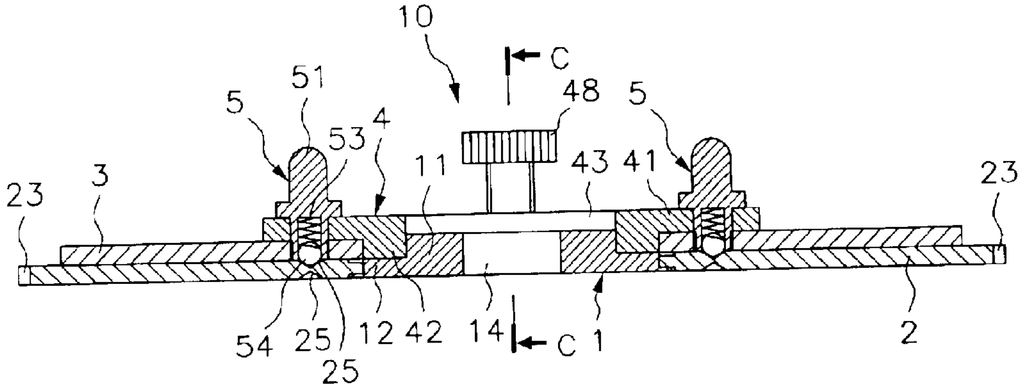
FIG. 8 is similar to FIG. 5 but showing the upper dial plate locked to the lower dial plate.
Figure 9:
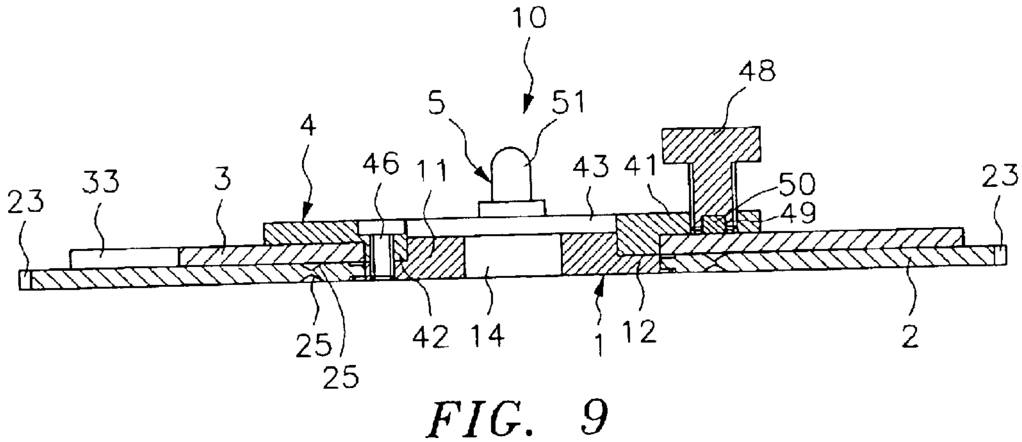
FIG. 9 is a sectional view taken along line C—C of FIG. 8.

The locators 5 each comprise a retaining member 51 respectively press-fitted into the locating holes 45 of the top holder plate 4 and inserted into the locating holes 32 of the upper dial plate 3. By means of moving the retaining members 51, the upper dial plate 3 can be rotated to the desired angle. Because the retaining members 51 of the locators 5 are loosely inserted into the locating holes 32 of the upper dial plate 3 can easily be removed from the retaining members 51 for changing the position upside-down. The retaining member 51 of each locator 5 has a bottom mounting hole 52, which accommodates a compression spring 53 and a steel ball 54. The periphery of the bottom end of the bottom mounting hole 52 of the retaining member 51 of each locator 5 is hammered down to reduce the inner diameter of the bottom end of the bottom mounting hole 52, preventing the steel ball 54 from falling down. The compression spring 53 imparts a downward pressure to the steel ball 54, keeping the steel ball 54 in close contact with the surface of the top side of the lower dial plate 2 for enabling the steel ball 54 to be selectively engaged into one recessed round hole 25 of the lower dial plate 2 (see FIG. 8) to hold the upper dial plate 3 on the bottom dial plate 2 in position.

In order to prevent relative displacement between the dial plates 2 and 3, the upper dial plate 4 is made having a screw hole 47, which receives, a holding down bolt 48, which has a bottom mounting hole 49, which accommodates a pressure block 50, which is molded from resin and partially protruding over the bottom side of the holding down bolt 48. When rotating the holding down bolt 48 clockwise, the holding down bolt 48 is spirally moved downwards to lower the pressure block 50 and to force the pressure block 50 downwardly against the upper dial plate 3, locking the upper dial plate 3 to the lower dial plate 2. On the contrary, when rotating the holding down bolt 48 counter-clockwise, the pressure block 50 is released from the upper dial plate 3, and therefore the upper dial plate 3 and the lower dial plate 2 are unlocked.

Figure 10:
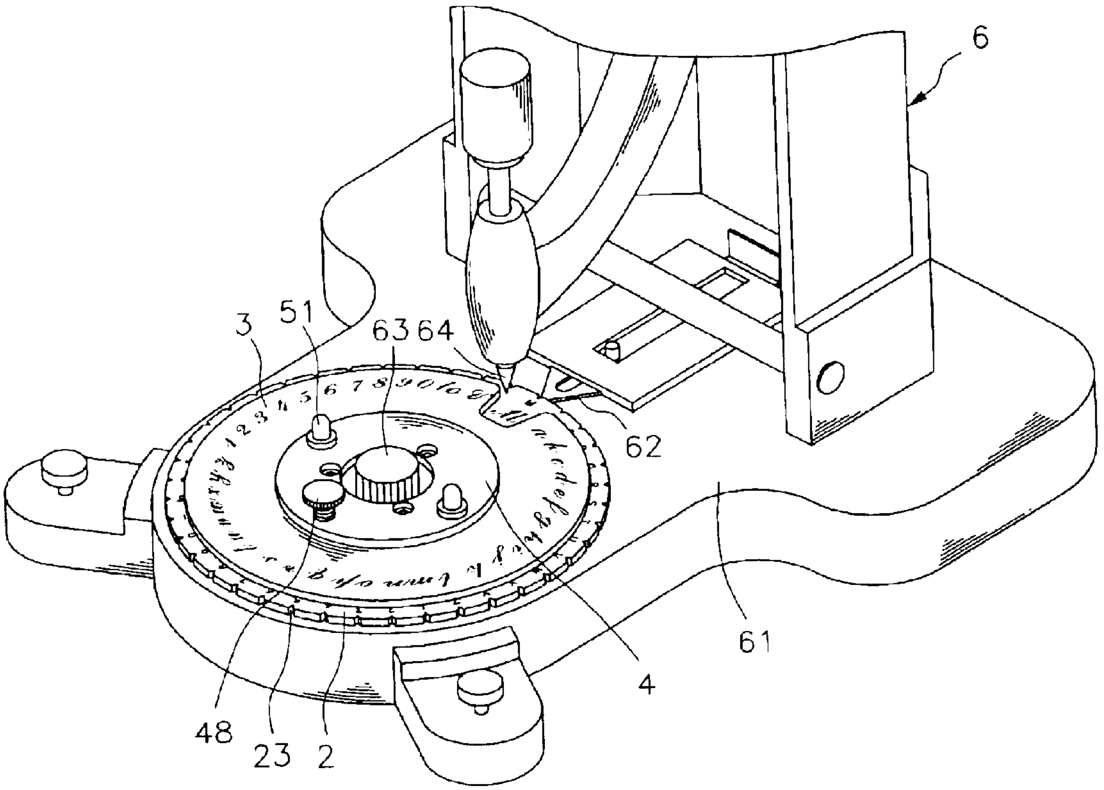
FIG. 10 is an installed view of the engraving dial in an inside ring engraving machine according to the present invention, showing the tracing of the tracing stylus shaft on the sign "M" at the lower dial plate.

When engraving words, for example, "My" on the inside ring and assuming that the initial "M" is at the lower dial plate 2 and the last letter "y" is at the upper dial plate 3, thus the engraving operation is as follows:

At first, as shown in FIG. 10, the engraving dial 10 is installed in the base 61 of the inside ring engraving machine 6, and then the engraving dial 10 is rotated to let the stopper 62 engage the V-notch 23 corresponding to the sign (letter) "M", holding the lower dial plate 2 in the engraving position. Thereafter, holding one retaining member 51 with the hand and moving it to rotate the upper dial plate 3 (at this time, the top holder plate 4 and the bottom holder plate 1 are rotated with the upper dial plate 3 relative to the lower dial plate 2), enabling the peripheral opening 33 to be moved to above the sign (letter) "M". And then, fastening up the tightening knob 63 to lock the engraving dial 10 to the base 61 of the inside ring engraving machine 6, thus the user can operate the inside ring engraving machine to move the tracing stylus shaft 64 on the letter "M", causing the diamond engraving cutter (not shown) to engrave the inside ring of the loaded ring.

Figure 11:
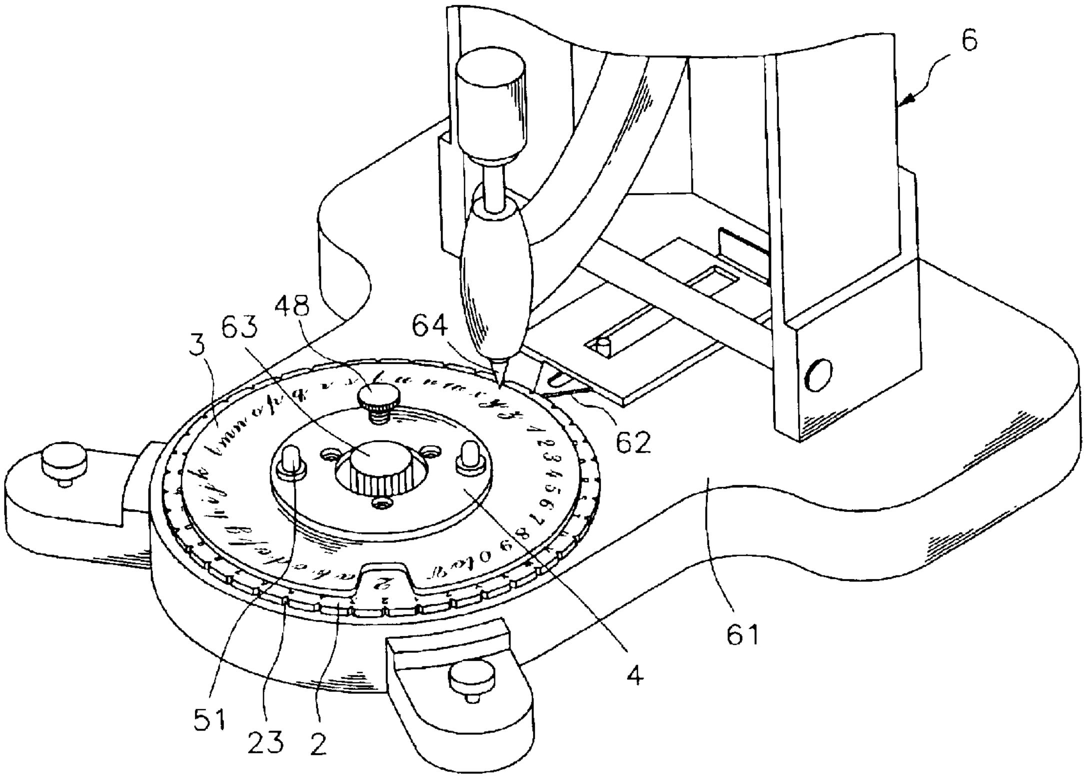
FIG. 11 is similar to FIG. 10 but showing the tracing of the tracing stylus shaft on the sign "y" at the upper dial plate.

When engraving the letter "y", as shown in FIG. 11, loosen the tightening knob 63, and then move one retaining member 51 to rotate the top holder plate 4, the upper dial plate 3 and the bottom holder plate 1 relative to the upper dial plate 3, for enabling the steel balls 54 of the locators 5 to be respectively engaged into the recessed round holes 25 of the lower dial plate 2. Upon engagement of the steel balls 54 into the recessed round holes 25 of the lower dial plate 2, a positioning click sound is produced (due to friction between the steel balls 54 and the peripheries of the recessed round holes 25), and the upper dial plate 3 is locked to the lower dial plate 2. At this time, the signs 34 at the upper dial plate 3 and the signs 24 at the lower dial plate 2 are respectively aligned. Thereafter, rotate the engraving dial 10 to let the stopper 62 engage the V-notch 23 corresponding to the sign "y", and then fasten up the tightening knob 63 to lock the engraving dial 10 to the base 61 of the inside ring engraving machine 6. Thus, the user can then engrave the sign "y" on the inside ring of the loaded ring.

It is necessary to operate the inside ring engraving machine 6 before engraving the sign "y", keeping a suitable distance between the sign "y" and the sign "M" (this distance is adjustable). Because the adjustment of such distance is of the known technique not within the scope of the present invention, no further detailed description in this regard is necessary.

When using the signs at the bottom side of the lower dial plate 2 the bottom side of the upper dial plate 3, the tightening knob 46 is removed from the base 61 of the inside ring engraving machine 6, and then the top holder plate 4 is separated from the bottom holder plate 1, and then the upper dial plate 3 and the lower dial plate 2 are taken away from the holder plates 1 and 4 and turned upside-down, and then the dial plates 2 and 3 are reloaded and locked.

As indicated above, the upper dial plate 3 and the lower dial plate 2 each have two sets of signs respectively engraved on the respective top and bottom sides, therefore there are total four combinations of signs for selection, i.e., the first combination includes the signs at the top side of the upper dial plate and the signs at the top side of the lower dial plate; the second combination includes the signs at the top side of the lower dial plate and the signs at the bottom side of the upper dial plate; the third combination includes the signs at the bottom side of the lower dial plate and the signs at the top side of the upper dial plate; the fourth combination includes the signs at the bottom side of the lower dial plate and the signs at the bottom side of the upper dial plate.

A prototype of engraving dial for inside ring engraving machine has been constructed with the features of FIGS. 5~11. The engraving dial for inside ring engraving machine functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An engraving dial comprising:

a bottom holder plate, said bottom holder plate comprising an upper part, a lower part, the lower part of said bottom holder plate having an outer diameter greater than the upper part of said bottom holder plate, a center through hole through the lower part and upper part of said bottom holder plate, and a plurality of screw holes extended through the lower part of said bottom holder plate and equiangularly spaced around the center through hole of said bottom holder plate;

a lower dial plate, said lower dial plate comprising a center through hole adapted to accommodate the lower part of said bottom holder plate, a plurality of peripheral notches equiangularly spaced around the periphery thereof, two sets of signs respectively engraved on top and bottom sides thereof at imaginary radial lines between the center through hole of said lower dial plate and said peripheral notches, a plurality of recessed round holes symmetrically formed at the top and bottom sides and equiangularly spaced around the center through hole of said lower dial plate at an imaginary circle concentric to the center through hole of said lower dial plate;

an upper dial plate, said upper dial plate comprising a center through hole, a peripheral opening, two sets of signs respectively engraved on top and bottom sides thereof corresponding to the signs at said lower dial plate;

a top holder plate, said top holder plate comprising an upper part, a lower part fitted into the center through hole of said upper dial plate, the lower part of said top holder plate having a diameter smaller than the upper part of said top holder plate, a center through hole adapted to accommodate the upper part of said bottom holder plate, and a plurality of countersunk holes respectively fastened to the screw holes of said bottom holder plate by screws; and at least one locator, said at least one locator each comprising a retaining member respectively fastened to and vertically extended through said top holder plate, said retaining member having a bottom mounting hole, a compression spring mounted in the bottom mounting hole of said retaining member, and a steel ball supported on said compression spring at a bottom side and forced by said compression spring to selectively engage the recessed round holes of said lower dial plate.

2. The engraving dial as claimed in claim 1, wherein said upper dial plate further comprises a screw hole, and a holding down bolt threaded into said screw hole and rotated downwards/upwards to lock said upper dial plate to said lower dial plate or to unlock said upper dial plate from said lower dial plate, said holding down bolt having a pressure block disposed at a bottom side thereof for pressing on the top side of said lower dial plate.

3. The engraving dial as claimed in claim 1, wherein the lower part of said lower dial plate has a flange radially extended around the periphery thereof; said lower dial plate has two annular grooves symmetrically formed in the top and bottom sides around the center through hole thereof and adapted to selective receive the flange of said lower dial plate.

* * * * *